United States Patent Office 3,422,074
Patented Jan. 14, 1969

3,422,074
METHOD FOR THE PRODUCTION OF TRIOXANE COPOLYMER CONTAINING NITROGEN
Shinichi Ishida and Shizuko Saito, Tokyo, Japan, assignors to Asahi Kasei Kogyo Kabushiki Kaisha, Osaka, Japan, a corporation of Japan
No Drawing. Filed Jan. 21, 1965, Ser. No. 427,115
Claims priority, application Japan, Jan. 23, 1964, 39/2,907
U.S. Cl. 260—67.5          17 Claims
Int. Cl. C08g 1/18; C08g 9/24

ABSTRACT OF THE DISCLOSURE

A process for the improvement of polyoxymethylene and also for the production of a polyoxymethylene copolymer containing a small amount of carboxylic acid derivative group containing nitrogen which comprises copolymerizing trioxane with an unsaturated dibasic aliphatic derivative of maleic and itaconic acids containing nitrogen by the action of ionizing radiation or a catalyst.

---

This invention relates to a new method for the production of a trioxane copolymer having high thermal stability, and the object thereof consists in producing trioxane copolymer by which molds having excellent properties, in particular good whiteness and thermal stability, can be provided.

It has hitherto been known that polyoxymethylene in which —CH$_2$O-units appear repeatedly in the molecule is produced by acting on anhydrous formaldehyde with light, ionizing radiation or catalysts such as, for example, amines, onium salts and organometallic compounds in the presence or absence of organic solvent, or by exposing trioxane, a cyclic trimer of formaldehyde to ionizing radiation in solid phase or by the action of catalysts such as, for example, antimony trifluoride, boron trifluoride and the like in a solution. Nevertheless, the polyoxymethylene thus obtained is not satisfactory due to the lack of thermal stability when it is molded as it is.

The present invention is concerned with the improvement of such polyoxymethylene and also with a method for the production of polyoxymethylene copolymer containing a small amount of carboxylic acid derivative group containing nitrogen which comprises polymerizing trioxane in the presence of a small quantity of an unsaturated dibasic aliphatic carboxylic acid derivative containing nitrogen by the action of ionizin gradiation or catalyst.

To explain the present invention in more detail, polyoxymethylene chains are subject to decomposition by heat or other causes and the manner of decomposition is almost that of degradation which is started from an end group. When polyoxymethylene chains are intended to have different bonds or different structures therein, the degradation is interrupted at that place, so that the thermal stability of the copolymer is improved. According to this invention, it has been found that the effect of thermal stability is achieved by including carboxylic acid derivative group containing nitrogen in the polyoxymethylene, inserted into the polyoxymethylene chains by copolymerization.

As unsaturated dibasic aliphatic carboxylic acid derivatives containing nitrogen used in this invention, there are maleamide-esters, malediamide, N-substituted maleamide such as N,N'-dimethylmaleamide and N-methylmaleamide, maleimide, N-methylmaleimide, N-phenylmaleimide, N-cyclohexylmaleimide, maleic hydrazide, N-substituted maleic hydrazide, such as N-phenyl maleic hydrazide derivatives, N-methyl maleic hydrazide, itaconamide, N-substituted itaconamide such as N,N'-dimethylitaconamide, N-methylitaconamide and N-phenylitaconamide, itaconimide, N-substituted itaconimide such as N-phenylitaconimide and N-methylitaconimide, itaconic hydrazide, itaconic hydrazide derivatives such as N-phenylitaconic hydrazide and the like. The amount of these derivatives used is from 0.01 to 50% by weight of the trioxane and the amount is determined depending upon the kind of the monomer used. Both components are mixed in the form of a solution in addition to being mixed by addition or fusion and there are no particular limitations to the method of mixing. One method for the polymerization is carried out by ionizing radiation and there is usually employed the conventional well known method similar to that of polymerizing trioxane only by ionizing radiation in solid phase. This method for polymerization includes radiation polymerization and polymerization utilizing the after effect of pre-irradiation (post-polymerization). In the former, polymerization takes place during irradiation at a temperature between room temperature and 100° C. while, in the latter, pre-irradiation is carried out at a temperature between liquid nitrogen bath temperature and room temperature and, after irradiation, polymerization takes place by heating the irradiated reaction mixture at a temperature between 30° C. and the melting point of the reaction mixture.

Ionizing radiations which are effective for the polymerization are α-ray, β-ray and γ-ray, and it is particularly convenient and easy in practice to employ γ-ray irradiation by a Van de Graaff generator and by cobalt 60 as a source. There are no particular limits to the irradiation dose, but too high irradiation causes the decomposition of the high polymer, so that it is not preferable. There is also no particular limit to the dose rate.

The polymerization can also be carried out by other means than radiation. That is to say, compounds which are concerned with the present invention such as sulfonic acid esters, sulfinic acid esters and sulfuric acid esters and further special compounds of organic peroxide, or the well known catalysts such as antimony fluoride, aluminium chloride, and boron fluoride or its derivatives, known as polymerization catalyst for trioxane alone, are used as copolymerization catalysts.

There is no limit to the amount of the catalysts used in particular and generally 0.001% to 1% by weight is used in the case of acidic catalysts, 0.001% to 10% by weight is used in the case of oxide of sulfur catalysts such as organic sulfonic acid esters and 0.001% to 10% by weight is used in the case of peroxide catalysts.

The polymerization temperature is almost the same as in the catalytic polymerization of trioxane and preferably is in the range from room temperature to 150° C. Any solvents may be used so long as the polymerization is not hindered by them.

The polymers obtained as above described are washed and extracted with a suitable solvent such as acetone, alcohol, water and the like. Even after unreacted monomers and vinyl-homo-polymer have been removed from the polymer, it is observed by elementary analysis, infrared absorption spectra and other chemical detection methods that carboxylic acid derivative groups containing nitrogen are contained in the structure of the polyoxymethylene. The thermal property of the polyoxymethylene obtained is by no means deteriorated even by the coexistence of unreacted monomer containing nitrogen and its homo-polymer without treating with such solvent as above described.

The copolymer obtained according to the method of this invention has excellent whiteness and if suitable conditions are chosen, polyoxymethylene having a high degree of polymerization, good thermal stability and good processability can be produced. Furthermore, it is preferable that stabilizers for heat and light such as phenols, urea, thiourea, amines, amides and the like be employed at the same time in the trioxane copolymer containing nitrogen as generally used in polyoxymethylene and an antioxidant is further employed therewith. It is also preferable that the end hydroxyl group be esterified, for example, with ketene or acetic anhydride and the like and urethanated with isocyanate to make the copolymer more stable.

The following examples are presented in illustration of this invention in more details and are not intended to be restrictive of the scope of this invention.

Example 1

5 g. of trioxane crystals were mixed intimately with 1 g. of itaconamide, fused and degassed in an ampule at −20° C. The mixture in the ampule was then irradiated with γ-ray from a cobalt 60 source at a dose rate of $5.1 \times 10^4$ γ/hr. at −20° C. for a period of two hours. After irradiation, the ampule was heated on a water bath at 55° C. for a period of 48 hours. The reaction mixture was continuously extracted with ethanol for five hours and then dried under reduced pressure. The yield was 3.5 g.

In the infrared absorption spectrum of the reaction product, there was observed an absorption by amide group near 1680 cm.$^{-1}$ besides the absorption by polyoxymethylene. By this fact, it was confirmed that the copolymerization of trioxane with itaconamide had taken place.

The thermal decomposition rate of above reaction product at the temperature of 222° C. was 0.14% per minute.

Example 2

9 g. of trioxane were mixed intimately with 1 g. of maleimide, introduced into an ampule and sealed after degassed at −20° C. The mixture was irradiated with γ-ray at a dose rate of $5.1 \times 10^4$ γ/hr. at 60° C. for a period of 48 hours. The reaction mixture was continuously extracted with methanol for five hours and dried under reduced pressure. The yield was 7.4 g.

In the infrared absorption spectrum of the reaction product, there was observed absorptions characteristic of five membered ring imide at 1770 cm.$^{-1}$ and 1700 cm.$^{-1}$ besides the absorption by polyoxymethylene. It was found that the polymer contains 0.33% of nitrogen. By this fact, the product was confirmed to be a copolymer of trioxane with maleimide. The thermal decomposition rate of above reaction product was 0.11% per minute at 222° C.

Example 3

10 g. of trioxane were mixed intimately with 1 g. of itaconamide, fused and degassed in an ampule at −20° C. The mixture in the ampule was irradiated with γ-ray for a period of 48 hours in the same manner as in Example 2. The reaction mixture was continuously extracted with methanol for a period of five hours and then dried under reduced pressure. The yield was 6.8 g. Copolymerization characteristics of the amide were observed by infrared absorption spectra. The melting point of the product was 183° to 184° C. and the thermal decomposition rate at 222° C. was 0.13% per minute. The thermal decomposition rate of the above reaction product which has been subjected to acetylation with acetic anhydride was 0.09% per minute, showing extremely good processing property.

Example 4

10 g. of trioxane were mixed intimately with 1 g. of N-methylmaleamide, fused, charged into an ampule and degassed. The mixture was irradiated at a dose rate of $5.1 \times 10^4$ γ/hr. with γ-ray of a cobalt 60 source having an intensity of 400 curies at 50° C. for a period of 48 hours. The reaction mixture was heated to 60° C. under reduced pressure completely to remove unreacted trioxane.

The yield was 5.3 g. The reaction product was heated to 160° C. for a period of three hours under reduced pressure to remove unstable parts thereof. This product was hot pressed to permit forming a tough film.

Example 5

10 g. of trioxane were mixed intimately with 1 g. of maleic dihydrazide, fused, polymerized and treated in the same manner as in Example 1 to obtain 8.2 g. of polyoxymethylene containing 2.31% of nitrogen. The reaction product was esterified with acetic anhydride and pyridine by a conventional method and hot pressed to permit forming a tough film. $K_{222}$ of this product was 0.07% per minute. The product obtained in the same manner as above by acetylation of the polymer which had been obtained under the same conditions without maleic hydrazide, showed $K_{222}$ of 0.18% per minute.

Example 6

10 g. of trioxane were mixed intimately with 1 g. of itaconic dihydrazide, fused, degassed and polymerized in the same manner as in Example 1. The reaction mixture was treated in the same manner as in Example 1 to obtain 7.2 g. of polyoxymethylene containing 1.2% of nitrogen. The reaction product was acetylated and hot pressed to permit forming a tough film.

Example 7

Trioxane was polymerized with comonomer and treated in the same manner as in Example 1 to obtain a polymer. The results are summarized in the following table.

TABLE I

| Trixane, (g.) | Comonomer | Yield | M.P. | N, percent | $K_{222}$ of diacetate |
|---|---|---|---|---|---|
| 10 | N-phenylitaconic hydrazide, 1.0 g. | 7.1 | 176 | 0.32 | 0.19 |
| 10 | Itaconimide, 1.0 g. | 8.2 | 174 | 0.26 | 0.09 |

Example 8

10 g. trioxane and 2 g. of itaconamide were dissolved into 10 ml. of toluene in an ampule and flashed with nitrogen after which 0.01 g. of boron trifluoride-ether complex compound was added to the ampule and the ampule was sealed. After the solution was heated on an oil bath to 90° C. for a period of 24 hours, the ampule was opened and the reaction mixture was extracted sufficiently with acetone, reprecipitated with dimethyl formamide, washed well with methanol and dried under reduced pressure. The yield was 7.2 g. and the melting point was 178° C.

The nitrogen content of the reaction product was 1.22% by elementary analysis and absorptions by oxymethylene sequence and imide group were observed in infrared absorption spectrum.

The thermal decomposition rate $K_{222}$ of the product was 0.12% per minute and $K_{222}$ of a part of above product acetylated with acetic anhydride and pyridine by conventional method was 0.07% per minute. The remainder of the above product was further treated with heat at 160° C. for a period of two hours, showing $K_{222}$ of 0.06% per minute. All of them above described were hot pressed to permit forming a tough film.

Example 9

20 g. of trioxane and 1 g. of maleimide were dissolved in 20 ml. of toluene in an ampule, 0.02 g. of boron trifluoride-diethyl etherate being added thereto. The ampule was sealed and heated at 80° C. for a period of 24 hours. The solution was treated in the same manner as in Example 4 to obtain 17.1 g. of polymer having a melting point of 176° C.

The nitrogen content of the reaction product was 0.21% by elementary analysis and imide group was also observed in infrared absorption spectrum.

The thermal decomposition rate was 0.18% per minute and the product was hot pressed to permit moulding a film.

oxymethylene has a terminal hydroxyl group and comprising esterifying said terminal hydroxyl group with ketene or acetic anhydride.

EXAMPLES 10 TO 13

| Examples | Catalyst (g.) | Trioxane (g.) | Comonomer (g.) | Yield | M.P. | N, percent | $K_{222}$ of polymer |
|---|---|---|---|---|---|---|---|
| 10 | $BF_3 \cdot Et_2O$, 0.01 | 10.0 | N-methyl maleimide, 1.0 | 7.6 | 172 | 0.31 | 0.18 |
| 11 | Ethyl p-nitro benzene sulfonate, 0.01 | 10.0 | Maleimide, 1.0 | 3.21 | 167 | 1.75 | 0.15 |
| 12 | $BF_3 \cdot Et_2O$, 0.01 | 10.0 | N-methyl maleamide, 1.0 | 6.1 | 172 | 0.22 | 0.17 |
| 13 | $BF_3 \cdot Et_2O$, 0.01 | 10.0 | N-methylitaconamide, 1.0 | 7.2 | 173 | 0.18 | 0.19 |

What we claim is:

1. A method for producing a thermally stable polyoxymethylene which comprises copolymerizing trioxane with 0.01 to 50% by weight of at least one nitrogen containing unsaturated dibasic aliphatic derivative of maleic or itaconic acid selected from the group consisting of maleamides, itaconamides, maleimides, itaconimides, maleic hydrazides and itaconic hydrazides, said copolymerization being effected in the solid phase by irradiation with a ray selected from the group consisting of α-, β- and γ-rays.

2. A method for producing a thermally stable polyoxymethylene which comprises copolymerizing trioxane with 0.01 to 50% by weight of at least one nitrogen containing unsaturated dibasic aliphatic derivative of maleic or itaconic acid selected from the group consisting of maleamides, itaconamides, maleimides, itaconimides, maleic hydrazides and itaconic hydrazides, in the presence of a catalyst selected from the group consisting of sulfonic acid esters, organic peroxides, antimony fluoride, aluminum chloride and boron fluoride.

3. A method according to claim 1, wherein said unsaturated dibasic aliphatic derivative is selected from the group consisting of malediamide, N,N'-dimethyl maleamide, N-methyl maleamide, maleimide, N-methyl maleimide, N-phenyl maleimide, N-cyclohexyl maleimide, maleic hydrazide, N-phenyl maleic hydrazide, N-methyl maleic hydrazide, itaconamide, N,N'-dimethyl itaconamide, N-methyl itaconamide, N-phenyl itaconamide, itaconimide, N-phenyl itaconimide, N-methyl itaconimide, itaconic hydrazide and N-phenyl itaconic hydrazide.

4. A method according to claim 2, wherein said unsaturated dibasic aliphatic derivative is selected from the group consisting of malediamide, N,N'-dimethyl maleamide, N-methyl maleamide, maleimide, N-methyl maleimide, N-phenyl maleimide, N-cyclohexyl maleimide, maleic hydrazide, N-phenyl maleic hydrazide, N-methyl maleic hydrazide, itaconamide, N,N'-dimethyl itaconamide, N-methyl itaconamide, N-phenyl itaconamide, itaconimide, N-phenyl itaconimide, N-methyl itaconimide, itaconic hydrazide and N-phenyl itaconic hydrazide.

5. A method according to claim 2, wherein 0.001 to 10% by weight of the catalyst is used.

6. A method according to claim 1, comprising adding a stabilizer selected from the group consisting of urea, phenols, thiourea, amines and amides to the polyoxymethylene.

7. A method according to claim 2 comprising adding a stabilizer selected from the group consisting of urea, phenols, thiourea, amines and amides to the polyoxymethylene.

8. A method according to claim 1 comprising adding an antioxidant to the polyoxymethylene.

9. A method according to claim 2 comprising adding an antioxidant to the polyoxymethylene.

10. A method according to claim 1, wherein the polyoxymethylene has a terminal hydroxyl group and comprising esterifying said terminal hydroxyl group with ketene or acetic anhydride.

11. A method according to claim 2, wherein the polyoxymethylene has a terminal hydroxyl group and comprising esterifying said terminal hydroxyl group with ketene or acetic anhydride.

12. A method according to claim 1, wherein the polyoxymethylene has a terminal hydroxyl group and comprising urethanating said terminal hydroxyl group with an isocyanate.

13. A method according to claim 2, wherein the polyoxymethylene has a terminal hydroxyl group and comprising urethanating said terminal hydroxyl group with an isocyanate.

14. A thermally stable polyoxymethylene prepared by copolymerizing trioxane with 0.01 to 50% by weight of at least one nitrogen containing unsaturated dibasic aliphatic derivative of maleic or itaconic acid selected from the group consisting of maleamides, itaconamides, maleimides, itaconimides, maleic hydrazides and itaconic hydrazides, in the solid phase by irradiation with a ray selected from the group consisting of α-, β- and γ-rays or in the presence of 0.001 to 10% by weight of a catalyst selected from the group consisting of sulfonic acid esters, organic peroxides, antimony fluoride, aluminum chloride and boron fluoride.

15. A thermally stable polyoxymethylene according to claim 14, wherein said unsaturated dibasic aliphatic derivative is selected from the group consisting of, malediamide, N,N'-dimethyl maleamide, N-methyl maleamide, maleimide, N-methyl maleimide, N-phenyl maleimide, N-cyclohexyl maleimide, maleic hydrazide, N-phenyl maleic hydrazide, N-methyl maleic hydrazide, itaconamide, N,N'-dimethyl itaconamide, N-methyl itaconamide, N-phenyl itaconamide, itaconimide, itaconic hydrazide and N-phenyl itaconic hydrazide.

16. A thermally stable polyoxymethylene according to claim 14 having a terminal hydroxyl group esterified with ketene or acetic anhydride.

17. A thermally stable polyoxymethylene according to claim 14 having a terminal hydroxyl group urethanated with an isocyanate.

References Cited

UNITED STATES PATENTS

| | | | |
|---|---|---|---|
| 3,131,165 | 4/1964 | Hermann et al. | 260—45.9 |
| 2,668,154 | 2/1954 | Orth | 260—72 |
| 3,116,267 | 12/1963 | Dolce | 260—67 |
| 2,509,183 | 5/1950 | Auten | 260—72 |
| 2,810,708 | 10/1957 | Kubico | 260—45.9 |
| 3,152,101 | 10/1964 | Dolce | 260—45.9 |
| 3,313,752 | 4/1967 | Sack | 204—159.21 |

FOREIGN PATENTS

| | | |
|---|---|---|
| 895,115 | 5/1662 | Great Britain. |
| 961,007 | 6/1964 | Great Britain. |
| 630,795 | 11/1963 | Belgium. |

WILLIAM H. SHORT, *Primary Examiner.*

E. M. WOODBERRY, *Assistant Examiner.*

U.S. Cl. X.R.

260—67, 72, 73, 45.9; 204—159.21